# (12) United States Patent
Aschaber et al.

(10) Patent No.: US 8,746,200 B2
(45) Date of Patent: Jun. 10, 2014

(54) RECIPROCATING-PISTON INTERNAL COMBUSTION ENGINE WITH MASS BALANCING DEVICE

(75) Inventors: Michael Aschaber, Aschach a. d. Steyr (AT); Josef Wagner, Wolfsbach (AT)

(73) Assignee: Steyr Motors GmbH, Steyr (AT)

( * ) Notice: Subject to any disclaimer, the term of this patent is extended or adjusted under 35 U.S.C. 154(b) by 0 days.

(21) Appl. No.: 13/641,922

(22) PCT Filed: Apr. 22, 2011

(86) PCT No.: PCT/AT2011/000206
§ 371 (c)(1),
(2), (4) Date: Oct. 18, 2012

(87) PCT Pub. No.: WO2011/130772
PCT Pub. Date: Oct. 27, 2011

(65) Prior Publication Data
US 2013/0032116 A1 Feb. 7, 2013

(30) Foreign Application Priority Data
Apr. 23, 2010 (AT) .................................. A 664/2010

(51) Int. Cl.
*F02B 75/06* (2006.01)
(52) U.S. Cl.
USPC ...................................................... 123/192.2
(58) Field of Classification Search
USPC ...................................................... 123/192.2
See application file for complete search history.

(56) References Cited

U.S. PATENT DOCUMENTS

| 1,259,086 | A | * | 3/1918 | Dunn | .............................. 74/603 |
| 1,605,986 | A | * | 11/1926 | Redfield | ......................... 74/603 |
| 2,235,160 | A | | 3/1941 | Ljungstrom | |
| 5,435,059 | A | * | 7/1995 | Chawla | ..................... 29/888.08 |

(Continued)

FOREIGN PATENT DOCUMENTS

| DE | 30 34 978 | 4/1982 |
| DE | 30 40 686 | 5/1982 |

(Continued)

OTHER PUBLICATIONS

International Search Report of PCT/AT2011/000206, Oct. 5, 2011.

*Primary Examiner* — Lindsay Low
*Assistant Examiner* — Charles Brauch
(74) *Attorney, Agent, or Firm* — Collard & Roe, P.C.

(57) ABSTRACT

The invention relates to a reciprocating-piston internal combustion engine (1) having at least one engine cylinder (2, 3) and at least one piston oscillating therein, and having at least one balancing mass (14) which is driven in an oscillating manner by a crankshaft (11) via a crank throw (15) and a compensating connecting rod (16), and which is guided in a translatory fashion by means of a linear guide (17) assigned in each case to the respective balancing mass (14). The linear guide (17) is formed by at least two guide elements (18, 19), which are spaced apart from one another, for the balancing mass (14). A bearing (23) for articulatedly connecting to the compensating connecting rod (16) is formed on the balancing mass (14) in a central portion between the two mutually spaced apart guide elements (18, 19). A mass balancing system is thereby created, which ensures as high a degree of running smoothness as possible, in particular as low a level of vibration as possible, and which at the same time can be realized in as cheap and practicable manner as possible.

12 Claims, 6 Drawing Sheets

(56) References Cited

U.S. PATENT DOCUMENTS

Figure 1:
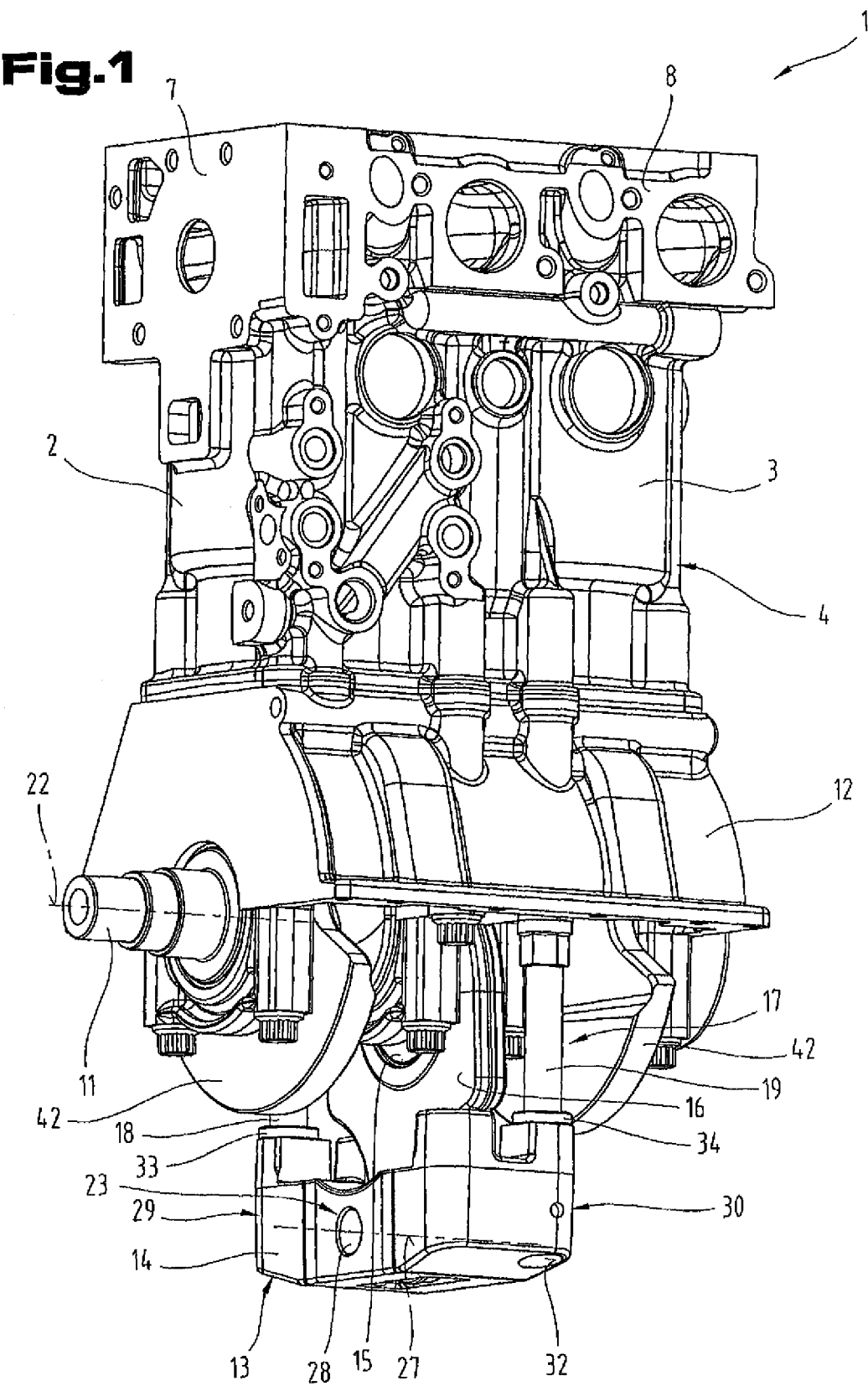

| | | | |
|---|---|---|---|
| 5,947,074 A | 9/1999 | Yapici | |
| 6,086,260 A * | 7/2000 | Dahlberg | 384/457 |
| 6,295,962 B1 * | 10/2001 | Walker | 123/192.2 |
| 6,382,166 B1 | 5/2002 | Klika et al. | |
| 6,732,697 B1 | 5/2004 | Berger | |
| 2002/0046625 A1 * | 4/2002 | Leith | 74/603 |
| 2002/0104505 A1 * | 8/2002 | Ericson | 123/197.2 |
| 2003/0183187 A1 * | 10/2003 | Menzel et al. | 123/192.2 |
| 2004/0123830 A1 * | 7/2004 | Bonde et al. | 123/196 R |
| 2006/0286398 A1 * | 12/2006 | Achim et al. | 428/615 |
| 2007/0175419 A1 * | 8/2007 | Ishimitsu | 123/55.5 |
| 2010/0290942 A1 * | 11/2010 | Becker et al. | 419/5 |
| 2011/0067666 A1 * | 3/2011 | Hashimoto et al. | 123/192.2 |

FOREIGN PATENT DOCUMENTS

| | | |
|---|---|---|
| DE | 31 20 190 | 5/1982 |
| DE | 36 07 133 | 9/1987 |
| DE | 296 14 589 | 12/1997 |
| GB | 14797 | 0/1905 |
| GB | 1 065 686 | 4/1967 |

* cited by examiner

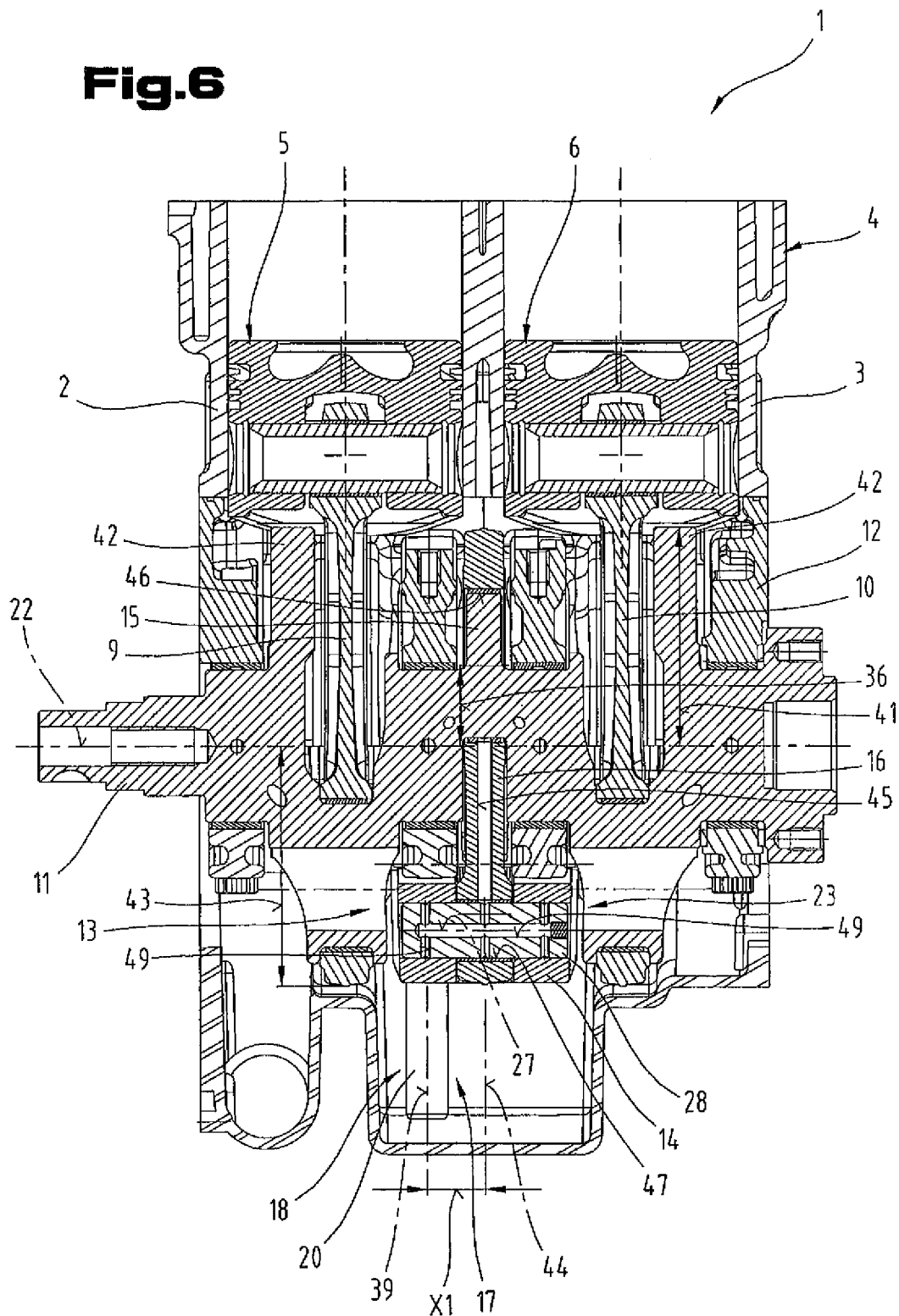

RECIPROCATING-PISTON INTERNAL COMBUSTION ENGINE WITH MASS BALANCING DEVICE

CROSS REFERENCE TO RELATED APPLICATIONS

This application is the National Stage of PCT/AT2011/000206 filed on Apr. 22, 2011, which claims priority under 35 U.S.C. §119 of Austrian. Application No. A 664/2010 filed on Apr. 23, 2010, the disclosure of which is incorporated by reference. The international application under POT article 21(2) was not published in English.

The invention relates to a reciprocating-piston internal combustion engine with at least one engine cylinder and at least one piston oscillating therein, which reciprocating-piston internal combustion engine comprises at least one balancing mass driven in an oscillating manner by a crankshaft via a crank throw and via a compensating connecting rod for balancing inertia forces and, if necessary, mass moments of inertia, as defined in claim 1.

DE 30 34 978 A1 discloses a device for compensating free mass moments of inertia of at least the first and second order of reciprocating-piston crankshaft engines. The purpose of this device is to eliminate or balance as far as possible the free mass moments of inertia which lead to relatively rough running. Particularly in the case of in-line engines with an uneven number of cylinders, such as three-cylinder or five-cylinder engines or in the case of V6 engines, free mass moments of inertia occur which need to be compensated as far as possible in order to guarantee comfortable running of the engine. To this end, balancing masses driven in an oscillating manner by crank drives are disposed symmetrically with respect to the center of the crankshaft, which are disposed on opposite sides from one another relative to the crankshaft and connected to one another by crank throws disposed in a diametrically opposite arrangement. In particular, an oscillating balancing mass is provided at the front and rear ends of the crankshaft relative to its longitudinal axis, which are intended as a means of balancing the free mass moments of inertia overall, for example of a three-cylinder engine. These balancing masses are either guided in linear guides on the stationary engine housing or alternatively are guided by arms articulatedly mounted on the stationary housing, in particular by means of at least one rocker arm. How these guides and bearings for the balancing masses are designed in structural terms is not specified in this publication. The structural requirements are also more complex due to the fact that a plurality of oscillating balancing masses are provided, which means that more mounting space is needed, thereby resulting in a detrimental increase in assembly costs.

DE 30 40 686 A1 discloses a device for balancing inertia forces of the second order of four-cylinder in-line crankshaft engines with crank throws disposed symmetrically with respect to the crankshaft center. In this instance, a balancing mass driven by the crankshaft via a crank drive is provided, which is retained at the crankshaft center in an essentially oscillating arrangement in the plane of the working cylinders on the side of the crankshaft remote from the working cylinders, and the crank throw of which is disposed in the plane of the crank throws of the working cylinders. The proposed approach is to guide the balancing mass in an oscillating arrangement in a linear guide on the stationary housing in the plane of the working cylinders, or alternatively to guide it in an arm retained on the stationary housing in a pivoting arrangement. Features for dimensioning the mass balancing device are also proposed. No practicable design for mounting the arm or the linear guide for the balancing mass is specified in this publication.

DE 31 20 190 A1 also describes a reciprocating-piston internal combustion engine with at least one balancing mass driven in an oscillating fashion by the crankshaft via a crank drive. Additional technical functions are assigned to the balancing masses provided as a means of balancing the free inertia forces and mass moments of inertia, for example in the form of a supercharging pump for the working cylinders of the internal combustion engine. In particular, the balancing mass is provided in the form of a piston sliding in a cylinder, which also operates as a piston pump charging the working cylinder of the internal combustion engine. Especially in the case of a two-cylinder in-line four-stroke internal combustion engine with two pistons connected to the crankshaft via crank throws disposed in phase, a third cylinder is provided as the charging pump, which is disposed diametrically opposite the cylinders of the engine relative to the crankshaft axis, and is provided with a co-operating piston, which is driven by a crank pin of the crankshaft disposed diametrically opposite the crank pins of the pistons. The friction losses which occur between the piston defining the balancing mass and the cylinder can be reduced by providing a hydrostatic sliding bearing connected to the lubrication circuit of the engine. The balancing mass is therefore assigned an additional technical function. The structural features needed for this purpose are complex, however, and overall relatively cost-intensive. The proposed balancing mass guided linearly in a cylinder with an additional technical function in the form of a charging pump for the working cylinders has barely provided itself in practice.

DE 36 07 133 A1 also discloses a device for balancing free inertia forces and mass moments of inertia in a reciprocating-piston internal combustion engine. In this case, at least one balancing mass is provided, which is driven by an eccentric or cam arrangement. To enable the mass balancing device to fulfill other technical functions, the balancing mass directly or indirectly acts on at least one driving element of an auxiliary unit. Combining the mass balancing function with that of driving auxiliary units is intended to provide a particularly simple and compact design of an internal combustion engine. Such auxiliary units might include an air compressor, a hydraulic pump, a generator, a steering aid pump or an air-conditioning compressor. The balancing mass displaced in an oscillating motion by the cam is either of a frame-type or beam-type design and the actuator cam acts centrally on the balancing mass, and the balancing mass is guided in a linear motion by means of a piston guide disposed at the longitudinal center. This design has also not really proved itself in practice.

The underlying objective of this invention is to propose a reciprocating-piston internal combustion engine with a mass balancing system, which ensures as high a degree of running smoothness as possible, in particular as low a level of vibration as possible, and which at the same time can be implemented in as cheap and practicable manner as possible.

This objective is achieved by the invention on the basis of a reciprocating-piston internal combustion engine as described herein.

One advantage obtained as a result of a reciprocating-piston internal combustion engine incorporating the features described herein is that this mass balancing system firstly enables a particularly compact construction of the reciprocating-piston internal combustion engine to be obtained, so that it can be accommodated without problem even in restricted mounting spaces In particular, the increase in mounting space or the ultimate space requirement of this mass balancing system is relatively small, which means that, when mounted, this reciprocating-piston internal combustion engine is of only slighter bigger dimensions than a reciprocating-piston internal combustion engine of a conventional design without a mass balancing system. Furthermore, the running smoothness of such a reciprocating-piston internal combustion engine is relatively high and it is susceptible to very little vibration even with a low number of cylinders or with pistons operating in phase or synchronously. Another major advantage of the design proposed by the invention resides in the fact that such a mass balancing system can be produced relatively inexpensively, thereby resulting in economic production and goodvalue procurement, making it possible to service a relatively broad range of applications. Another major advantage of the specified design is that a reciprocating-piston internal combustion engine based on the design proposed by the invention is able to offer high strength and in particular requires no maintenance for a relatively long period. In particular, the demands made on it in terms of strength and lack of maintenance can be satisfied without problem on the basis of such a design.

Of particular importance in this respect is another embodiment described herein, because the free mass moments of inertia and inertia forces of the reciprocating-piston internal combustion engine can be virtually completely balanced whilst requiring the smallest possible or minimum space. It is of particular advantage that the number of components or the number of parts needed can be kept within limits or relatively small.

As a result of a further design described herein, the strength of the mass balancing system can be further increased. Specifically, it can be guaranteed that the reciprocating-piston internal combustion engine will require absolutely no maintenance during the period of its average service life and in terms of the usual periods for general servicing. In particular, by using sufficiently long anti-friction bushes in the balancing mass, excessive wear and the risk of the balancing mass moving out of line or jamming with respect to the rigidly secured guide bolts can be minimized.

A further design described herein results in a robust motion coupling between the balancing mass and the crank drive, in particular its compensating connecting rod, requiring no maintenance for long periods.

Also of particular advantage are further features described herein. Firstly, a tilt-free bearing and guiding action is obtained for the balancing mass. Furthermore, this linear guide can be produced and fitted in the engine housing particularly inexpensively. One major advantage resides in the fact that a compact design of the reciprocating-piston internal combustion engine is assured. The main aspect as a result is that the engine housing and crankshaft housing can be made to a relatively slim design or can be kept relatively slim. In particular, the width of the crankshaft housing and engine block transversely to the longitudinal axis of the crankshaft is not increased at all or is so only slightly, in spite of providing a mass balancing system. The mounting width of this reciprocating-piston internal combustion engine can therefore be kept relatively slim, even though an integrated mass balancing system is provided. Also as a result, a relatively low stroke height can be obtained for the balancing mass, thereby enabling the structural height of the internal combustion engine, i.e. its height measured parallel with the oscillating movement of the pistons, can be kept as low as possible.

Further features described herein enable a crankshaft housing to be obtained that is as slim and compact as possible, in which a highly effective device for balancing inertia forces and mass moments of inertia is accommodated. In particular, without having to increase the mounting space needed to accommodate the rotating motion of the crank drive for the at least one piston, the highly effective mass balancing system can also be accommodated.

Also of advantage is a further embodiment described herein, because the stability of the guide elements can be significantly increased and a high guiding accuracy and guiding stability can be obtained in addition whilst keeping the structure as lightweight as possible. Also as a result, vibration behavior can be positively influenced. In particular, the tendency of the guide elements or guide bolts to vibrate can be damped or prevented.

Also of advantage are further features described herein, because the most lightweight design possible is obtained as regards the guide elements for the balancing mass. Nevertheless, high stability requirements can still be met because the hollow guide elements offer an optimal and conducive stiffness and weight ratio.

As a result of a further embodiment described herein, the articulated bearing between the compensating connecting rod and the balancing mass can be easily connected to the pressurized lubricating circuit of the reciprocating-piston internal combustion engine. This also significantly improves the strength and reliability of the overall system.

Also of particular advantage are additional features described herein, because they result in reliably and adequately lubricated guide bores, which ensures reliable, long-term operation of the reciprocating-piston internal combustion engine without maintenance. In particular, the mass balancing system requires absolutely no maintenance during the average or during maximum anticipated operating hours.

a further embodiment described herein is also of particular advantage because a lubricant passage or transmission route for the lubricant is created, by means of which the lubricant is pressurized and forcibly conveyed to the guide surfaces for the balancing mass. In particular, this results in a particularly reliable supply of lubricating oil for the guide and slide surfaces between the balancing mass and its linear guide, which can be connected to the pressurized lubricating circuit.

As a result of a further design described herein, the most compact possible design of the reciprocating-piston internal combustion engine is achieved, in particular requiring the least possible space for mounting the crankshaft housing and for the bottom terminating pan or oil sump. Furthermore, the most compact possible or small-volume mass balancing body can be obtained which nevertheless has sufficient mass to fulfill the required mass balancing function. The essential aspect is that a balancing mass of this shape offers the most compact and space-saving mounting for the main bearings of the crankshaft in the bottom terminating pan and in the crankshaft housing relative to the counterweights for the crank throws of the crankshaft and in terms of the bearing shells.

Also of advantage is a furtherdesign described herein because it results in a sufficiently stable and reliable guiding action for the linearly oscillating balancing mass, even when the guide elements are placed under very dynamic or high loads.

Further features described herein are also of particular advantage because tipping moments or those moments which would otherwise cause the balancing mass to move out of line relative to the guide elements are eliminated or reduced to a minimum. In particular, any tilting of the balancing mass is avoided as far as possible, resulting in a highly reliable sliding and guiding action between the balancing mass and its guide. Furthermore, a clearance-free guide system can be obtained between the linearly oscillating balancing mass and the co-operating guide elements with relatively simple or relatively short guide lengths and which is functionally highly reliable and requires no maintenance for long periods.

To provide a clearer understanding, the invention will be described in more detail below with reference to the appended drawings.

Figure 2:
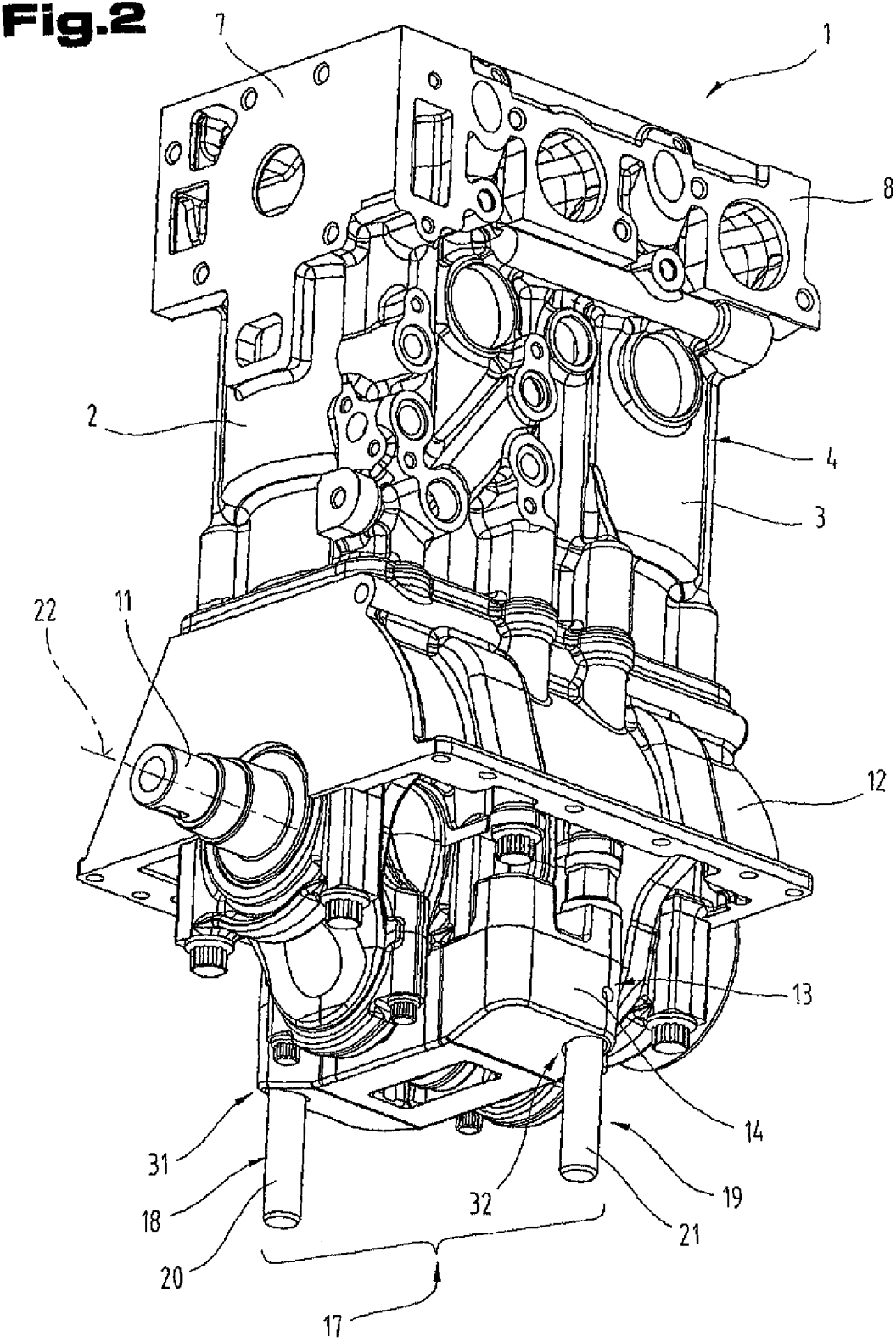
Figure 3:
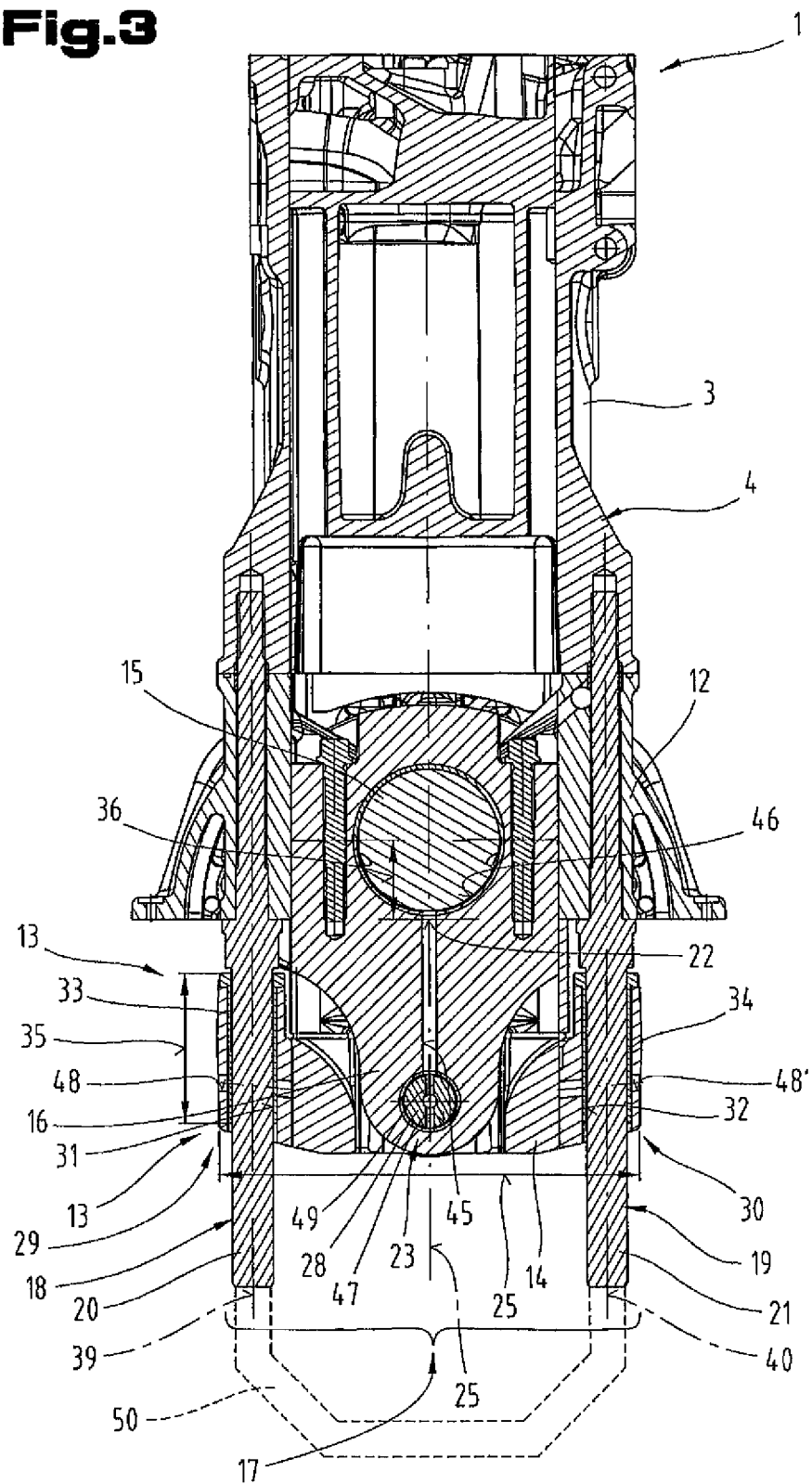
Figure 4:
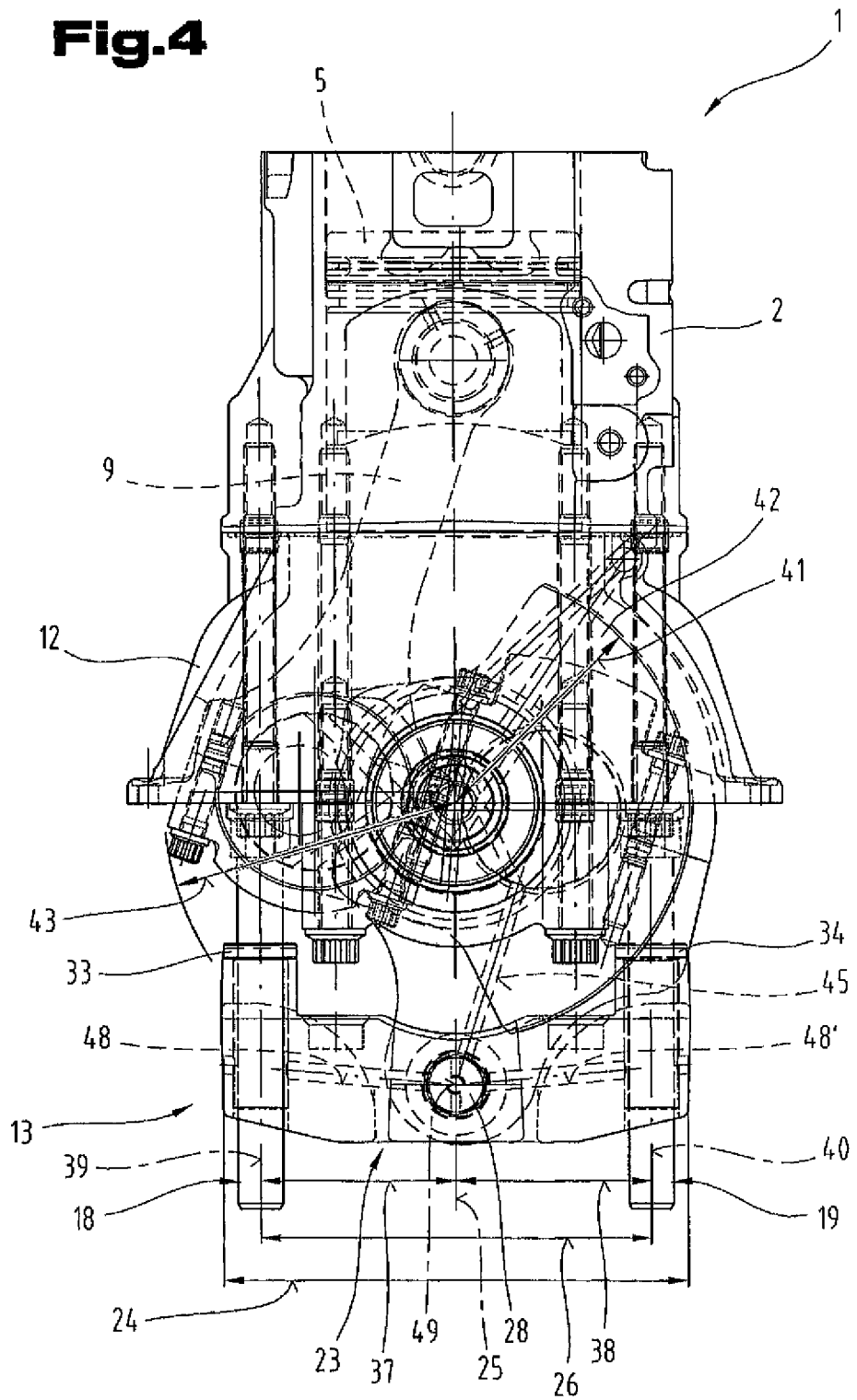
Figure 5:
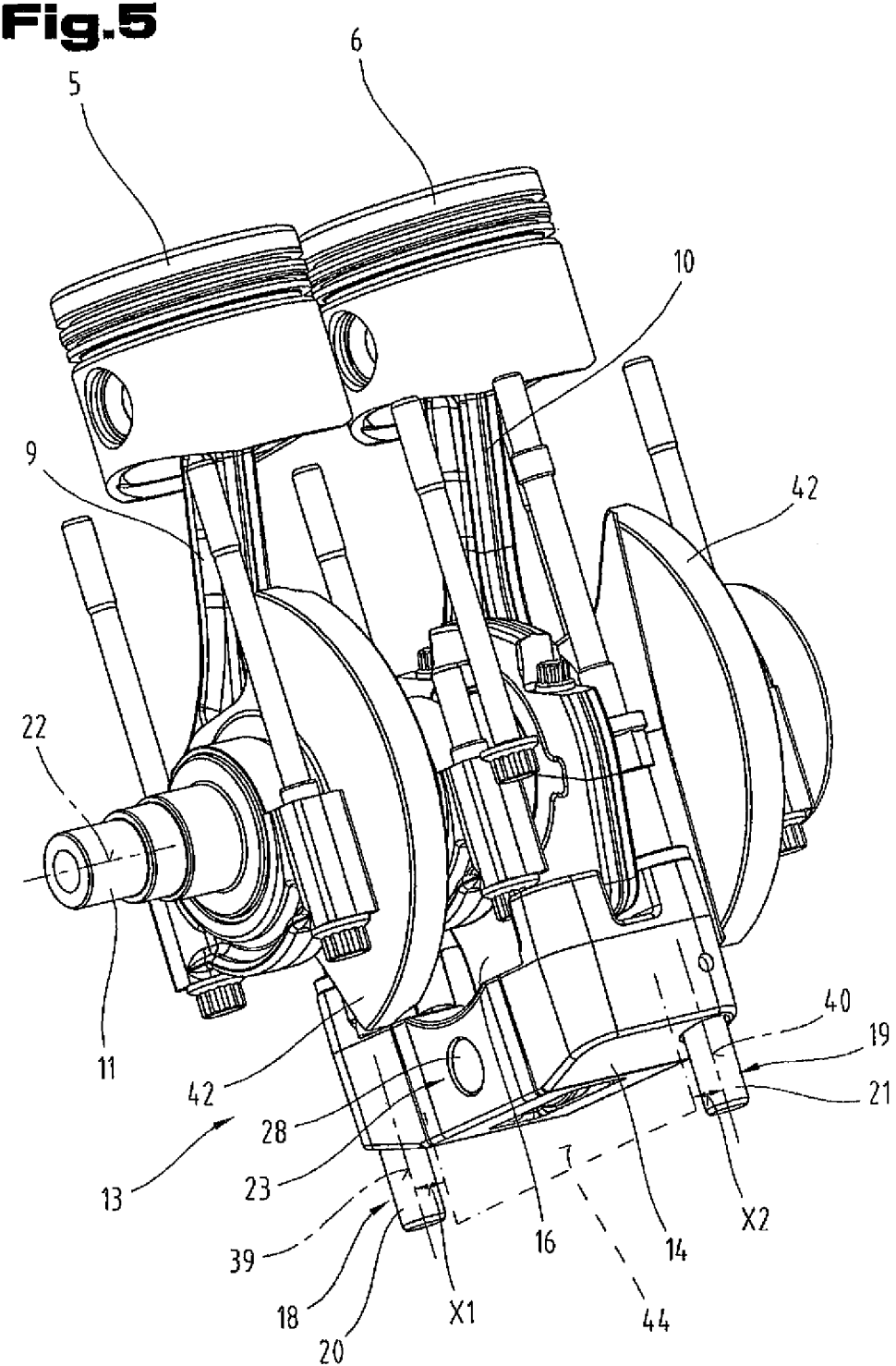

These are highly simplified, schematic diagrams illustrating the following:

FIG. 1 basic components of a reciprocating-piston internal combustion engine with a mass balancing system comprising a linearly guided balancing mass for balancing inertia forces, where the balancing mass is disposed in the region of the bottom dead center;

FIG. 2 the reciprocating-piston internal combustion engine shown in FIG. 1 in a state in which the linearly oscillating balancing mass is disposed in the region of the top dead center;

FIG. 3 a cross-section through the reciprocating-piston internal combustion engine illustrated in FIG. 2 in the region of the mass balancing system;

FIG. 4 a side view of the reciprocating-piston internal combustion engine illustrated in FIG. 1 with a plurality of imaginary lines to indicate how the internal components fit together;

FIG. 5 a perspective diagram showing a few components of the crank drive and mass balancing system of the reciprocating-piston internal combustion engine illustrated in FIG. 1;

FIG. 6 a longitudinal section illustrating an example of an embodiment of the reciprocating-piston internal combustion engine proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIGS. 1 to 6 illustrate by way of example some of the main parts of a reciprocating-piston internal combustion engine 1 based on the design proposed by the invention. As is clearly evident, to retain clarity and provide a clear illustration of the invention, these drawings show only the most essential components, as will be described below. Other additional technical components needed to provide a complete and functional construction for the reciprocating-piston internal combustion engine 1 lie within the know-how of the person skilled in the art.

As may best be seen from FIGS. 1, 2, a reciprocating-piston internal combustion engine of the generic type comprises at least one engine cylinder 2, 3, in particular at least one cylinder block 4 with at least one piston 5, 6 oscillating in it—FIG. 5. In a manner known per se, at least one cylinder head 7, 8, of a type known from the prior art is assigned to the respective engine cylinders 2, 3 or cylinder block 4 at the top end. The respective pistons 5, 6 are connected by means of connecting rods 9, 10 to a crankshaft 11 and are guided in an oscillating manner in the engine cylinders 3, 4 or in the cylinder block 4. The crankshaft 11 is mounted in a known manner so as to be rotatable in a crankshaft housing 12. The crankshaft housing 12 may be designed as a separate part—as illustrated by way of example—or may be an integral part of the cylinder block 4.

The generic reciprocating-piston internal combustion engine 1 further comprises at least one balancing device 13 for at least partially compensating inertia forces or mass moments of inertia which occur during operation of the reciprocating-piston internal combustion engine 1. This balancing device 13 comprises at least one balancing mass 14, which is driven and moved by the crankshaft 11 in an oscillating manner via a crank throw 15 and a compensating connecting rod 16. The at least one balancing mass 14 of the balancing device 13 is guided linearly or in translation by means of a linear guide 17 co-operating with the respective balancing mass 14 in each case.

The specified balancing device 13 is used to reduce vibrations and any tendency to wobble as far as possible, which primarily occurs during operation in the case of reciprocating-piston internal combustion engines 1 with a small number of cylinders. The specified balancing device 13 is particularly practical for use primarily with reciprocating-piston internal combustion engines 1 with two engine cylinders 2, 3 and reciprocating-piston internal combustion engines 1 with pistons 5, 6 moved synchronously or in phase.

The key aspect is that the linear guide 17 for the balancing mass 14, which oscillates, in particular in the same way as but in mirror image to the pistons 5, 6, comprises at least two guide elements 18, 19 spaced at a distance apart from one another. The mutually spaced apart guide elements 18, 19 for the balancing mass 14 are preferably provided in the form of separate guide elements. Based on one practical embodiment, the mutually spaced apart guide elements 18, 19 are provided in the form of guide bolts 20, 21 fixedly connected to the engine housing, in particular to the crankshaft housing 12. These guide bolts 20, 21 may be of the type known as stay bolts, which are oriented parallel with the cylinder running surface or parallel with the direction of movement of the pistons 5, 6 and disposed on the side of the crankshaft 11 opposite the pistons 5, 6 relative to the crankshaft 11.

The guide bolts 20, 21 for the balancing mass 14 may expediently have a circular cross-section, as may be seen from FIGS. 1, 2. Alternatively, however, it would also be conceivable for the guide elements 18, 19 to have a polygonal cross-section, in particular rectangular or square, for example to enable bending forces and elastic deformation movements acting on the guide elements 18, 19 to be more effectively absorbed or to afford higher resistance to these bending stresses in the main load direction.

It would also be possible for the guide elements 18, 19 to be of a hollow design, in particular in the form of hollow shafts or hollow sections with a polygonal cross-section. Accordingly, the guide elements 18, 19, in particular the guide bolts 20, 21, may be provided in the form of hollow bodies, in particular hollow cylinders. This enables an optimized ratio between the stability or stiffness of the linear guide 17 and the weight of the linear guide 17 to be obtained, especially as regards its guide elements 18, 19.

The guide elements 18, 19 for the oscillating balancing mass 14 are preferably rigidly connected to the crankshaft housing 12, in particular pressed into it or screwed into it.

Based on one advantageous embodiment illustrated in FIG. 3, the guide elements 18, 19 simultaneously serve as connecting elements which connect the crankshaft housing 12 and the at least one cylinder block 4 fixedly to one another or individual engine cylinders 2, 3 to the crankshaft housing 12, in particular screw them to one another. Accordingly, the end portions of the guide elements 18, 19 remote from the guide portion are designed as screw means, in particular are provided with at least one thread portion. The number of components needed can therefore be reduced as a result, offering a most cost-effective design and relatively inexpensive inventory management and supply of spare parts. For practical purposes, additional screw means are provided to connect said engine components. At least individual ones of these screws are preferably provided in the form of fixing screws for the bearing shells of the main bearing of the crankshaft 11, as may best be seen from FIG. 5.

The crank throw 15, which is aligned opposite the crank throws for the pistons 5, 6 by reference to the crankshaft axis 22, is connected to the balancing mass 14 as it moves via the compensating connecting rod 16. The crank throw 15 respectively the balancing mass 14 is preferably disposed centrally between the crank throws for the connecting rods 9, 10 of the pistons 5, 6 relative to the crankshaft axis 22 of the crankshaft 11. Especially if there is an even number of cylinders, the balancing mass 14 is disposed centrally between the outermost crank throws for the pistons 5, 6. This prevents mass moments of inertia which would otherwise cause wobbling or tilting movements of the reciprocating-piston internal combustion engine 1.

In this respect, it is of practical advantage if the end of the compensating connecting rod 16 remote from the crank throw 15 is connected to the balancing mass 14 so that a bearing 23 is provided in a middle portion between the two mutually spaced apart guide elements 18, 19 to provide an articulated connection to the compensating connecting rod 16. Especially if the balancing mass 14 has a symmetrical weight or mass distribution on its longitudinal extension 24—FIG. 4—it is of advantage if the articulated connection or bearing 23 between the compensating connecting rod 16 and the balancing mass 14 is disposed at the middle of the longitudinal extension 24, in particular as close as possible to what might be termed a mass plane of symmetry 25. The mass plane of symmetry 25 expediently also bisects a distance 26 between the mutually spaced apart guide elements 18, 19 constituting the linear guide 17.

It is of particularly practical effect if the axis 27 of a connecting bolt 28 between the balancing mass 14 and the compensating connecting rod 16 lies on or as close as possible to the center of gravity, in particular the mass center of gravity, of the balancing mass 14. The above-mentioned features enable a tilting moment of the oscillating balancing mass 14 relative to the guide elements 18, 19 to be avoided or kept to a minimum or significantly reduced, thereby minimizing detrimental mutual interactions, in particular friction or tendencies to move out of line. The articulated bearing 23 between the compensating connecting rod 16 and the linearly oscillating balancing mass 14 preferably comprises a bolt connection, in particular a connecting bolt 28, the bolt axis 27 of which—FIG. 1—extends parallel with the crankshaft axis 22.

In the distal end portions 29, 30 of the balancing mass 14—by reference to an extension running transversely to the crankshaft axis 22—guide bores 31, 32 are provided which co-operate with the guide elements 18, 19, in particular with the guide bolts 20, 21. These guide bores 31, 32 are preferably end-to-end bores in the balancing mass 14. This prevents jamming or damping between the guide elements 18, 19 and the balancing mass 14 sliding or guided on them and relative to their guide bores 31, 32. In particular, lubricant is able to penetrate unhindered through the end-to-end guide bores 31, 32, thereby ensuring an uninhibited sliding behavior of the balancing mass 14 relative to the pin-type guide elements 18, 19. In particular, this enables the linear guide 17 and balancing mass 14 to be accommodated in the crankshaft housing 12 or inside the oil sump of the reciprocating-piston internal combustion engine 1 without any difficulty.

In order to minimize sliding friction and ensure operation of the linear guide 17 without wear as far as possible, without maintenance for a long period and keep it functionally reliable, the guide bores 31, 32 are preferably provided in the form of anti-friction bushes 33, 34. These anti-friction bushes 33, 34 are secured in mounting bores of the balancing mass 14, for example pressed into it or screwed into it. These anti-friction bushes 33, 34 are expediently made from a metal material with good anti-friction properties with respect to the preferably metal guide elements 18, 19 and are thus subjected to less wear. The anti-friction bushes 33, 34 in the balancing mass 14 may be made from anti-friction bearing materials known from the prior art.

A guide length 35 of the anti-friction bushes 33, 34 with respect to the guide bolts 20, 21 secured in a rigid or non-moving arrangement on the engine housing is selected so that it is as long as possible in order to minimize the moments and surface pressure which might otherwise cause a movement out of line or friction in small surface areas of the balancing mass 14 relative to the linear guide 17. Based on one expedient and practical embodiment, the guide length 35 is approximately in a crank radius 36—FIG. 3—of the crank throw 15 for the compensating connecting rod 16. It is of practical advantage if the guide length 35 is between 70% and 140% of the crank radius 36 of the crank throw 15. The crank radius 36 of the crank throw 15 represents the radial distance of the center axis of the crank throw 15 or its crank pin from the crankshaft axis 22, as may best be seen from FIG. 3.

Based on one practical embodiment, as best illustrated in FIG. 4, the preferably bolt-type guide elements 18, 19 are disposed at radial distances 37, 38 from the crankshaft axis 22. In particular, the guide elements 18, 19 are positioned at an identical radial distance 37, 38 on either side of the crankshaft axis 22. In this respect, a radial distance 37, 38 between the guide or longitudinal axis 39, 40 of at least one of the guide bolts 20, 21 and the crankshaft axis 22 is shorter than a maximum radius of rotation 41—FIG. 5—of the counterweight(s) 42 to the crankshaft cranks for the pistons 5, 6. Alternatively or in combination, the shortest radial distance 37, 38 between the guide or longitudinal axis 39, 40 of the guide bolts 20, 21 and the crankshaft axis 22 is shorter than the biggest radius of rotation 43—FIG. 4—of the crank drives for the pistons 5, 6 of the reciprocating-piston engine. In particular, the guide or longitudinal axes 39, 40 of the guide elements 18, 19, preferably disposed in pairs, are positioned at a shorter radial distance from the crankshaft axis 22 than the maximum radius of rotation 41—FIG. 5, 6—of the counterweights 42 or the biggest radius of rotation 43—FIG. 4, 6—of the crank drives. The biggest radius of rotation 43 of the crank drives for the piston(s) 5, 6 is usually defined by the bearing shells or by the screw heads for the bearing shells of the connecting rod bearing, as may best be seen from FIGS. 4, 6. This results in the most compact possible design, thereby ensuring the slimmest possible crankshaft housing 12.

The most compact and slimmest dimensions of the reciprocating-piston internal combustion engine 1 and its crankshaft housing 12 can also be achieved by spacing the elements of the pair of guide elements 18, 19 in the axial direction with respect to the crankshaft axis 22, as may best be seen from FIGS. 5, 6. In particular, the guide elements 18, 19 are spaced at an axial distance X1, X2 before and after a longitudinal mid-plane 44 or dividing plane of the compensating connecting rod 16. This means that the guide elements 18, 19 positioned on either side of the crankshaft axis 22 are offset and spaced at a distance apart from one another by reference to the axial direction of the crankshaft 11 and by reference to the crankshaft axis 22. As a result, it is possible to make the compensating connecting rod 16 as such so that it is voluminous, relatively speaking, or wide and heavy, and a part of the mass serving as the balancing mass 14 can co-operate with the compensating connecting rod 16 or transmit to the compensating connecting rod 16. This being the case, the compensating connecting rod 16 can already assume the mass balancing function and may be of a relatively voluminous or heavy design compared with the connecting rods 9, 10 for the pistons 5, 6, as may best be seen from FIG. 5. In particular, the compensating connecting rod 16 may expediently be provided with a large radial extension, as a result of which the compensating connecting rod 16 is also of a relatively voluminous and relatively heavy design in the portions lying closest to the balancing mass 14, especially in the end portion with the bearing 23. In spite of the voluminous design of the compensating connecting rod 16, the reciprocating-piston internal combustion engine 1 may be of a relatively slim design in the region of the crankshaft housing 12 if the guide elements 18, 19 disposed in pairs on either side of the crankshaft axis 22 are also spaced at a distance apart from one another in the axial direction of the crankshaft axis 22 and positioned before and after the compensating connecting rod 16 by reference to a longitudinal mid-plane 44 of the compensating connecting rod 16 in the axial direction of the crankshaft axis 22. In other words, the compensating connecting rod 16 is disposed between the mutually spaced apart guide elements 18, 19 lying opposite one another in the axial direction of the crankshaft axis 22 or between the guide bolts 20, 21, as may best be seen from FIGS. 5, 6. This enables the relatively compact dimensions of the reciprocating-piston internal combustion engine 1 to be combined with a highly effective balancing device 13 for balancing inertia forces and mass moments of inertia. By reference to what is an approximately rectangular body forming the balancing mass 14 as seen in plan view, the guide elements 18, 19 and guide bores 31, 32 co-operating with them are disposed in diagonally opposite corner points of the balancing mass 14, as may best be seen from FIGS. 2, 5. The compensating connecting rod 16, which is relatively voluminous compared with the connecting rods 9, 10 for the pistons 5, 6, therefore moves in the gap between the guide elements 18, 19 for the balancing mass 14 mutually spaced apart in the axial direction of the crankshaft 11.

Since the compensating connecting rod 16 can be made to the most voluminous or heaviest design possible, especially in the end portion lying closest to the articulated bearing 23 for the balancing mass 14, this end portion of the compensating connecting rod 16 also primarily serves as a balancing mass and a part of the mass of the compensating connecting rod 16 can contribute to the mass of the balancing mass 14.

Based on one practical embodiment, at least one lubricant passage 45 is provided in the compensating connecting rod 16, which connects the first and second connecting rod eyes 46, 47 to one another. This lubricant passage 45 in the compensating connecting rod 16 is used to transfer a preferably pressurized liquid lubricant from the first connecting rod eye 46 to the second connecting rod eye 47. The first connecting rod eye 46 is disposed in what might be termed the connecting rod foot which is connected to the crank throw 15 of the crankshaft 11. The second, relatively smaller connecting rod eye 47 is articulatedly connected to the balancing mass 14 via the connecting bolt 28. Lubricant conveyed by means of a lubricant pump, not illustrated, into the first connecting rod eye 46 is therefore conveyed via the lubricant passage 45 of the articulated bearing 23 between the second connecting rod eye 47 and the balancing mass 14, thereby ensuring that the articulated bearing 23 is capable of withstanding a high degree of stress without requiring maintenance for a long period of time. The lubricant passage 45 preferably extends inside the so-called connecting rod shaft, for example along the longitudinal mid-axis of the compensating connecting rod 16, and establishes a flow connection between the first and second connecting rod eye 46, 47, in particular between their bearing points.

Based on one practical embodiment, at least one other, in particular at least one second lubricant passage 48, 48' is provided, extending from the articulated bearing 23 between the balancing mass 14 and the compensating connecting rod 16 to supply the linear guide 17 more intensively and forcibly with lubricant. In particular, at least one second lubricant passage 48, 48' is provided, in each case to the guide bores 31, 32 respectively to the anti-friction bushes 33, 34, extending in particular from the articulated bearing 23 on the balancing mass 14, as may best be seen from FIG. 4. In the embodiment illustrated as an example, therefore, at least one lubricant passage 48, 48' is provided in each case, extending from the articulated bearing 23 between the compensating connecting rod 16 and the balancing mass 14 to each of the guide elements 18, 19, in particular to each guide bore 31, 32 respectively co-operating with them, provided as a means of delivering pressurized lubricant to the linear guide 17, in particular to the guide bores 31, 32 and to the anti-friction bushes 33, 34 inserted in them. This ensures that the linear guide 17 is reliably, in particular forcibly and sufficiently, lubricated as intended. This also means that the co-operating balancing device 13 with the linearly moved balancing mass 14 functions particularly reliably, enabling the reciprocating-piston internal combustion engine 1 to operate without maintenance for the longest possible time.

The path taken by the pressurized lubricant to the linear guide 17 is therefore as follows: from the crankshaft 11, the lubricant is fed via the first connecting rod eye 46 and through the lubricant passage 45 in the compensating connecting rod 16 to the second connecting rod eye 47, where it contributes to the function of lubricating the articulated connection 23. In the connecting rod eye 46, in particular via the interior of the connecting bolt 28, some of the delivered lubricant is specifically directed into the other lubricant passages 48, 48' and then to the linear guide 17, in particular the guide bores 31, 32 in the balancing mass 14 and the external portions of the guide elements 18, 19.

To provide a reliable and adequate supply of lubricant to the linear guide 17, it is expedient to connect the first lubricant passage 45 and the at least one second lubricant passage 48, 48' by means of at least one connecting passage 49 extending through the connecting bolt 28 of the articulated bearing 23 to establish a flow connection, as may best be seen from FIGS. 4, 6. This ensures that pressurized lubricant is specifically transferred from the first lubricant passage 45 into the at least one second lubricant passage 48, 48'. The co-operating connecting passage 49 in the connecting bolt 28 thus extends in the axial and radial direction with respect to its bolt axis 27. The at least one lubricant passage 48, 48' preferably runs inside the balancing mass 14 and extends between the articulated bearing 23 and the at least two guide elements 18, 19 respectively guide bores 31, 32, as may best be seen from FIG. 4.

Instead of providing the pair of guide elements 18, 19 for the balancing mass 14 as illustrated, where the guide elements 18, 19 are disposed on either side of the crankshaft axis 22, it would also be possible to provide more than two guide elements 18, 19. As viewed parallel with the guiding direction of the guide elements 18, 19, the balancing mass 14 expediently has an approximately rectangular contour. Accordingly, a guide element 18, 18' and 19, 19'—although not illustrated—may be disposed respectively in each corner region of the essentially rectangular balancing mass 14 as seen in plan view. This multiple arrangement in the corner regions of the balancing mass 14 means that a linear guide 17 for the balancing mass 14 is obtained which is reliable and durable in the long term, even in the event of higher loads on the linear guide 17 transversely to its guiding direction.

One advantageous shape for the balancing mass 14 is one where the preferably metal body for the balancing mass 14 has an approximately rectangular contour as viewed parallel with the guiding direction of the guide elements 18, 19 and an arc-shaped or sickle-shaped contour as viewed parallel with the crankshaft axis 22, as may easily be seen above all by comparing FIGS. 4, 5. This results in an optimum use of space, offering a compact design of the reciprocating-piston internal combustion engine 1. In addition, the best possible ratio is obtained between the space needed and the mass of the balancing mass 14, in particular a good ratio between construction volume and active mass or effective mass of the balancing mass 14.

In order to improve the stability or dimensional stability of the linear guide 17, another option is to connect the guide elements 18, 19, which are preferably disposed in at least pairs or in groups of four, fixedly to one another by their free ends remote from the engine housing or crankshaft housing 12 by means of at least one connecting strut 50. This optional embodiment offers increased stability and dimensional stability of the guide elements 18, 19 extending out from the crankshaft housing 12 in a pin-type fashion, in particular the corresponding guide bolts 20, 21. A connecting strut 50 based on this design increases the height of the reciprocating-piston internal combustion engine 1 slightly, as schematically indicated in FIG. 3.

The embodiments illustrated as examples represent possible variants of the reciprocating-piston internal combustion engine 1 and balancing device 13, and it should be pointed out at this stage that the invention is not specifically limited to the variants specifically illustrated. Accordingly, all conceivable variants obtained by combining individual details of the embodiments illustrated and described are possible and fall within the scope of the invention.

For the sake of good order, finally, it should be pointed out that, in order to provide a clearer understanding of the structure of the reciprocating-piston internal combustion engine 1 and balancing device 13, they and their constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1 to 6 constitute independent solutions proposed by the invention in their own right. The objectives and associated solutions proposed by the invention may be found in the detailed descriptions of these drawings.

| List of reference numbers | |
| --- | --- |
| 1 | Reciprocating-piston internal combustion engine |
| 2 | Engine cylinder |
| 3 | Engine cylinder |
| 4 | Cylinder block |
| 5 | Piston |
| 6 | Piston |
| 7 | Cylinder head |
| 8 | Cylinder head |
| 9 | Connecting rod |
| 10 | Connecting rod |
| 11 | Crankshaft |
| 12 | Crankshaft housing |
| 13 | Balancing device |
| 14 | Balancing mass |
| 15 | Crank throw |
| 16 | Compensating connecting rod |
| 17 | Linear guide |
| 18 | Guide element |
| 19 | Guide element |
| 20 | Guide bolt |
| 21 | Guide bolt |
| 22 | Crankshaft axis |
| 23 | Bearing |
| 24 | Longitudinal extension |
| 25 | Mass plane of symmetry |
| 26 | Distance |
| 27 | Bolt axis |
| 28 | Connecting bolt |
| 29 | End portion |
| 30 | End portion |
| 31 | Guide bore |
| 32 | Guide bore |
| 33 | Anti-friction bush |
| 34 | Anti-friction bush |
| 35 | Guide length |
| 36 | Crank radius |
| 37 | Distance |
| 38 | Distance |
| 39 | Guiding and longitudinal axis |
| 40 | Guiding and longitudinal axis |
| 41 | Radius of rotation |
| 42 | Counterweight |
| 43 | Radius of rotation |
| 44 | Longitudinal mid-plane |
| 45 | Lubricant passage |
| 46 | Connecting rod eye |
| 47 | Connecting rod eye |
| 48, 48' | Lubricant passage |
| 49 | Connecting passage |
| 50 | Connecting strut |
| X1, X2 | Distance (axial) |

The invention claimed is:

1. Reciprocating-piston internal combustion engine having at least one engine cylinder and at least one piston oscillating therein, and having at least one balancing mass which is driven in an oscillating manner by a crankshaft via a crank throw and a compensating connecting rod, and which is guided in a straight translatory fashion by means of a linear guide assigned in each case to the respective balancing mass, and a bearing for articulatedly connecting to the compensating connecting rod is disposed on the balancing mass in a middle portion, wherein at least two mutually spaced apart guide elements provided in the form of guide bolts, which constitute the linear guide for guiding the balancing mass along a longitudinal axis of the guide elements in a translatory fashion, and which are oriented parallel with the direction of movement of the piston and fixedly connected to the engine housing and guide bores in the balancing mass, for sliding the balancing mass along the longitudinal axis of the guide bolts in a translatory fashion are provided in the distal end portion of the balancing mass, and the guide elements are positioned at a radial distance on either side of the crankshaft axis and are disposed spaced apart from one another in the axial direction with respect to the crankshaft axis.

2. Reciprocating-piston internal combustion engine according to claim 1, wherein the guide bores are provided in the form of anti-friction bushes secured in mounting bores of the balancing mass.

3. Reciprocating-piston internal combustion engine according to claim 1, wherein the articulated bearing between the compensating connecting rod and the balancing mass comprises a connecting bolt, the bolt axis of which extends parallel with the crankshaft axis.

4. Reciprocating-piston internal combustion engine according to claim 1, wherein a radial distance between the guiding and longitudinal axis of a guide bolt and the crankshaft axis is smaller in dimension than a maximum radius of rotation of the counterweights to the crankshaft cranks or smaller than the biggest radius of rotation of the crank drives for the pistons of the reciprocating-piston engine.

5. Reciprocating-piston internal combustion engine according to claim 1, wherein the guide elements are fixedly connected to one another via a connecting strut at their ends remote from the engine housing.

6. Reciprocating-piston internal combustion engine according to claim 1, wherein the guide bolts are provided in the form of hollow bodies.

7. Reciprocating-piston internal combustion engine according to claim 1, wherein a lubricant passage connecting a first and second connecting rod eye is disposed in the compensating connecting rod and is provided as a means of supplying the articulated bearing on the balancing mass with lubricant.

8. Reciprocating-piston internal combustion engine according to claim 1, wherein a lubricant passage is provided running from the articulated bearing on the balancing mass to the respective guide bores in each case.

9. Reciprocating-piston internal combustion engine according to claim 1, further comprising a first lubricant passage connecting a first and second connecting rod eye, the first lubricant passage being disposed in the compensating connecting rod and provided as a means of supplying the articulated bearing on the balancing mass with lubricant and a second lubricant passage provided running from the articulated bearing on the balancing mass to the respective guide bores in each case, wherein the first and second lubricant passage establish a flow connection via at least one connecting passage extending through a connecting bolt of the articulated bearing.

10. Reciprocating-piston internal combustion engine according to claim 1, wherein the balancing mass has an approximately rectangular contour as viewed parallel with the guiding direction of the guide elements and an approximately arc-shaped or sickle-shaped contour as viewed parallel with the crankshaft axis.

11. Reciprocating-piston internal combustion engine according to claim 1, wherein the balancing mass has an approximately rectangular contour as viewed parallel with the guiding direction of the guide elements and a guide element is assigned to each corner region of the balancing mass.

12. Reciprocating-piston internal combustion engine according to claim 1, wherein a connecting bolt between the balancing mass and the compensating connecting rod is disposed in such a way that its bolt axis lies on or as close as possible to the center of gravity, in particular the mass center of gravity, of the balancing mass.

* * * * *